United States Patent
Huang et al.

(10) Patent No.: US 9,983,764 B2
(45) Date of Patent: May 29, 2018

(54) METHOD, ELECTRONIC DEVICE, AND NON-TRANSITORY STORAGE MEDIUM FOR ADJUSTING ICONS

(71) Applicant: ScienBiziP Consulting (Shenzhen) Co., Ltd., Shenzhen (CN)

(72) Inventors: Li-Zhang Huang, New Taipei (TW); Yu Chen, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 355 days.

(21) Appl. No.: 14/812,098

(22) Filed: Jul. 29, 2015

(65) Prior Publication Data

US 2016/0342307 A1   Nov. 24, 2016

(30) Foreign Application Priority Data

May 19, 2015 (CN) .......................... 2015 1 0255214

(51) Int. Cl.
   *G06F 3/048* (2013.01)
   *G06F 3/0481* (2013.01)
   *G06F 3/0484* (2013.01)
   *G06F 3/0488* (2013.01)

(52) U.S. Cl.
   CPC ...... *G06F 3/04817* (2013.01); *G06F 3/04845* (2013.01); *G06F 3/04886* (2013.01)

(58) Field of Classification Search
   CPC ..... G06F 3/0481; G06F 3/0484; G06F 3/0488
   See application file for complete search history.

(56) References Cited

U.S. PATENT DOCUMENTS

| | | | |
|---|---|---|---|
| 9,086,731 B2* | 7/2015 | Hisano | G06F 3/017 |
| 2012/0071208 A1* | 3/2012 | Lee | H04M 1/72544 455/566 |
| 2014/0317555 A1* | 10/2014 | Choi | G06F 3/04817 715/781 |
| 2015/0020036 A1* | 1/2015 | Kim | G06F 3/04883 715/863 |
| 2016/0004416 A1* | 1/2016 | Kim | H04M 1/72563 715/769 |
| 2016/0034153 A1* | 2/2016 | Lejeune | G06F 3/04847 715/765 |

FOREIGN PATENT DOCUMENTS

CN   102163129 A   8/2011

* cited by examiner

*Primary Examiner* — Rashawn N Tillery
(74) *Attorney, Agent, or Firm* — ScienBiziP, P.C.

(57) ABSTRACT

In a method for adjusting icons on a desktop, movable points of the icon are obtained and marked. A movable point can be selected and that point on the boundary of an icon can be moved inside or away from the icon. The move operation includes a move direction and a move distance. The shape and size of the icon is adjusted according to the move direction and the move distance, and as the size of an adjusted icon is increased, additional information from the represented application program, such as a list of unopened emails in an email program, can be obtained and displayed.

17 Claims, 7 Drawing Sheets

METHOD, ELECTRONIC DEVICE, AND NON-TRANSITORY STORAGE MEDIUM FOR ADJUSTING ICONS

CROSS-REFERENCE TO RELATED APPLICATIONS

This application claims priority to Chinese Patent Application No. 201510255214.8 filed on May 19, 2015, the contents of which are incorporated by reference herein.

FIELD

The subject matter herein generally relates to icon management.

BACKGROUND

Many electronic devices have a GUI (Graphical User Interface). The GUI includes a lot of desktop icons representing application programs installed on the electronic device. The size and shape of the icons are generally unchangeable.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

Figure 1:
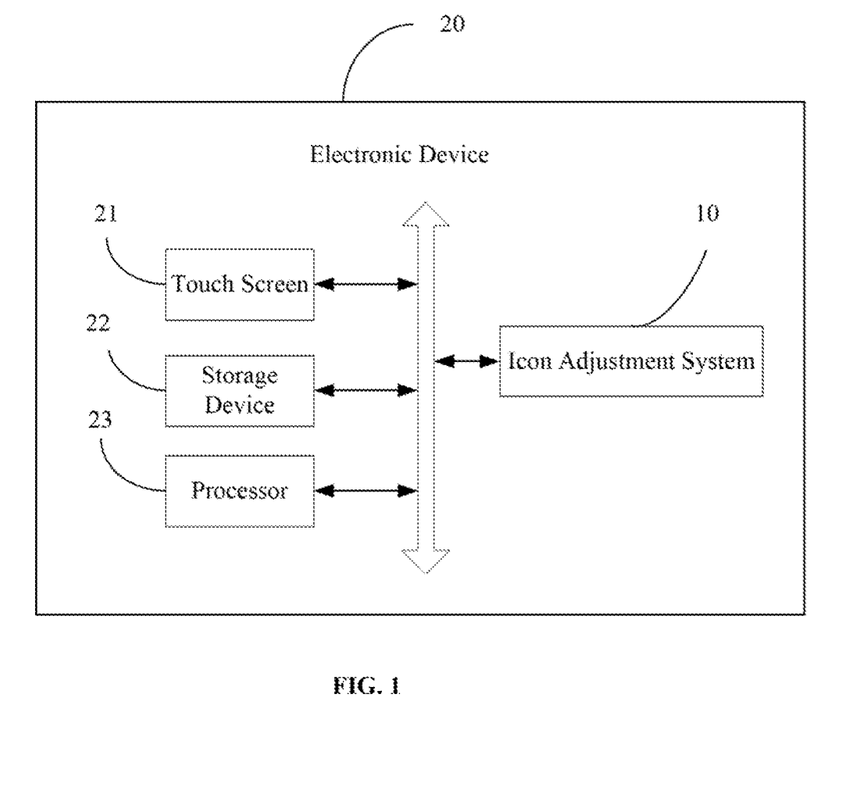
FIG. 1 is a block diagram of one embodiment of a hardware environment for executing an icon adjustment system.

FIG. 1 is a block diagram of one embodiment of a hardware environment for executing an icon adjustment system. The icon adjustment system 10 is installed and runs in an apparatus, for example an electronic device 20. In at least one embodiment as shown in FIG. 1, the electronic device 20 includes, but is not limited to, a touch screen 21, a storage device 22, and at least one processor 23. The electronic device 20 can be a tablet computer, a notebook computer, a smart phone, a personal digital assistant (PDA), or other suitable electronic device. FIG. 1 illustrates only one example of the electronic device; others can include more or fewer components than as illustrated, or have a different configuration of the various components in other embodiments.

The icon adjustment system 10 can obtain movable points of an icon and mark the movable points when a request to adjust the icon is made. The icon adjustment system 10 determines a selected movable point and a move operation applied on the selected movable point, and then adjusts the shape and size of the icon according to the move operation, and displays an adjusted icon to replace the original icon.

In at least one embodiment, the storage device 22 can include various types of non-transitory computer-readable storage mediums. For example, the storage device 22 can be an internal storage system, such as a flash memory, a random access memory (RAM) for temporary storage of information, and/or a read-only memory (ROM) for permanent storage of information. The storage device 22 can also be an external storage system, such as a hard disk, a storage card, or a data storage medium. The at least one processor 23 can be a central processing unit (CPU), a microprocessor, or other data processor chip that performs functions of the icon adjustment system 10 in the electronic device 20. The touch screen 21 can generate signals in response to touch operations. The touch screen 21 can display objects and information, such as icons of application programs.

Figure 2:
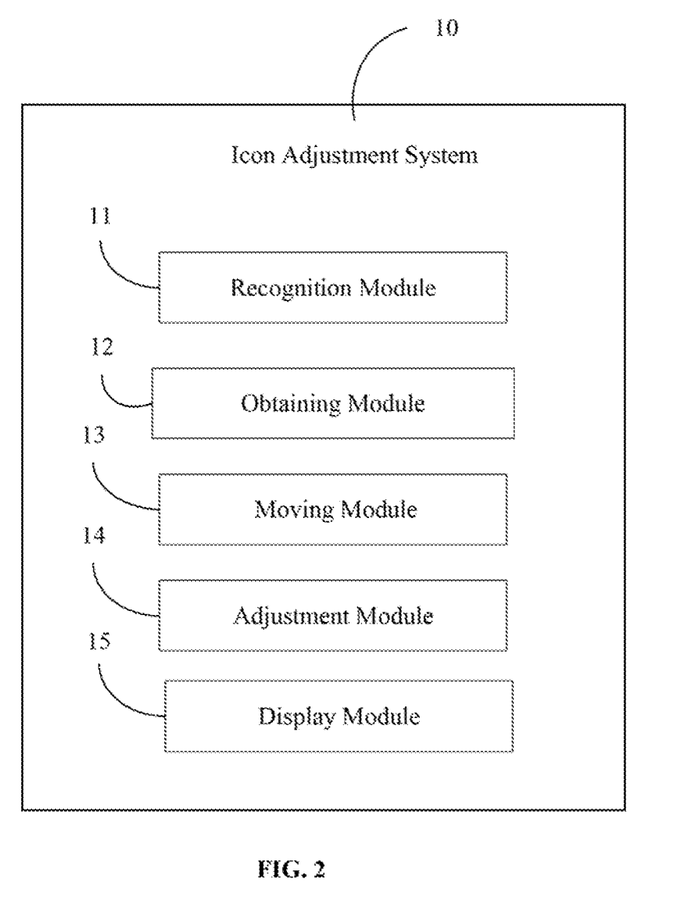
FIG. 2 is a block diagram of one embodiment of function modules of the icon adjustment system in FIG. 1.

FIG. 2 is a block diagram of one embodiment of the function modules of the icon adjustment system 10. In at least one embodiment, the icon adjustment system 10 can include a recognition module 11, an obtaining module 12, a moving module 13, an adjustment module 14, and a display module 15. The function modules 11-15 can include computerized codes in the form of one or more programs, which are stored in the storage device 22. The at least one processor 23 executes the computerized codes to provide functions of the function modules 11-15. A description of the functions of the modules 11-15 is given below in reference to FIGS. 3-7.

Figure 3:
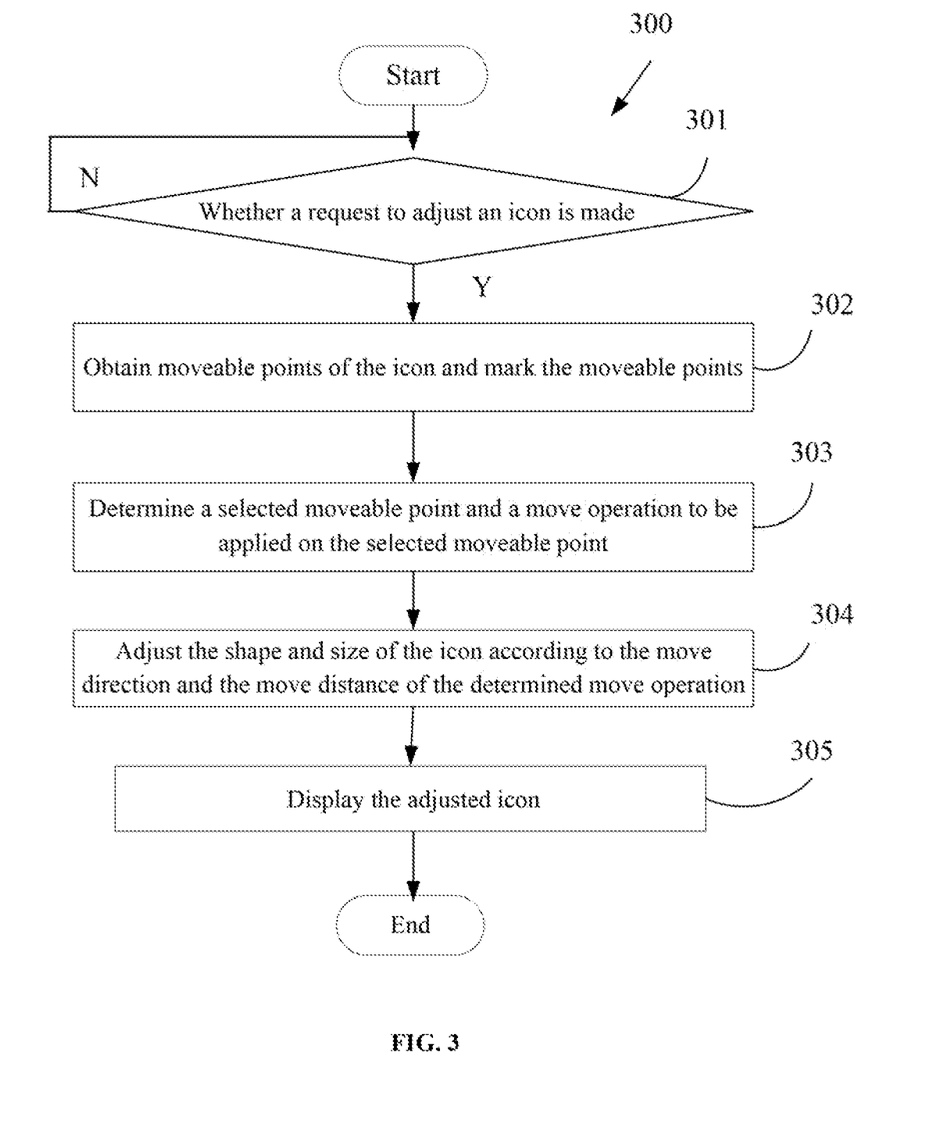
FIG. 3 is a flowchart of one embodiment of a method for adjusting icons.

FIG. 3 illustrates a flowchart of one embodiment of a method for adjusting icons. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods, or subroutines, carried out in the exemplary method 300. Furthermore, the illustrated order of blocks is by example only and the order of the blocks can change. The exemplary method 300 can begin at block 301 according to the present disclosure. Depending on the embodiment, additional steps can be added, others removed, and the ordering of the steps can be changed.

At block 301, the recognition module recognizes a request to adjust an icon of an application program is made by a user. If yes, the process goes to block 302, if no, the processes goes back to block 301.

In the embodiment, the storage device 22 stores application programs installed on the electronic device 20 and each application program has an icon. Each icon has an initial size and shape. In one embodiment, the shapes of all initial icons are a square of a certain size.

In the embodiment, the recognition module 11 recognizes a signal generated by the touch screen 21, and determines a touch location. When the touch location lies at one of vertexes of an icon, the recognition module 11 determines that the request to adjust the icon is made.

In other embodiments, a user can operate a particular touch button, icon, or menu, which is displayed on the touch screen 21, to input the request. In other embodiments, a user can press a particular key (not shown in FIGS) of the electronic device 20 to input the request.

At block 302, the obtaining module obtains movable points of the icon and visibly marks the movable points.

In the embodiment, some movable points lie at vertexes of the icon (hereinafter "vertex movable points"); and other movable points lie on sides of the icon (hereinafter "side movable point"), for example in a middle position of a side. In the embodiment, the obtaining module marks the movable points, for example, by adding a black dot at each of the movable points or by highlighting the movable points.

At block 303, the moving module determines a movable point selected by user and a move operation to be applied on the selected movable point. The move operation includes a move direction and a move distance.

The movable point can be moved from an initial position to a destination position, the point where a user releases the move operation is the destination position. In the embodiment, the moving module 13 determines that a move operation is applied on the touch screen 21 according to signals generated by the touch screen 21 and further determines a move direction and a move distance of the move operation.

At block 304, the adjustment module adjusts the shape and size of the icon according to the determined move direction and the move distance of the move operation.

In the embodiment, the adjustment module 14 minimizes or magnifies the icon according to the move direction and the move distance of the move operation. For example, the adjustment module 14 shrinks the icon when a movable point of the icon is moved towards inside of the icon. The adjustment module 14 magnifies the icon when a movable point of the icon is moved away from the icon. In one embodiment, the adjustment module 14 minimizes the icon by folding the icon or compressing the icon.

When a vertex movable point of an icon is moved to a new position, the adjustment module 14 re-establishes a shape of the icon by line connecting the moved vertex point and two neighboring vertex points. When a side movable point of an icon is moved to a new position, the adjustment module 14 re-establishes a shape of the icon by line connecting the moved side point and the two vertex points of the side which included the side movable point.

Figure 4:
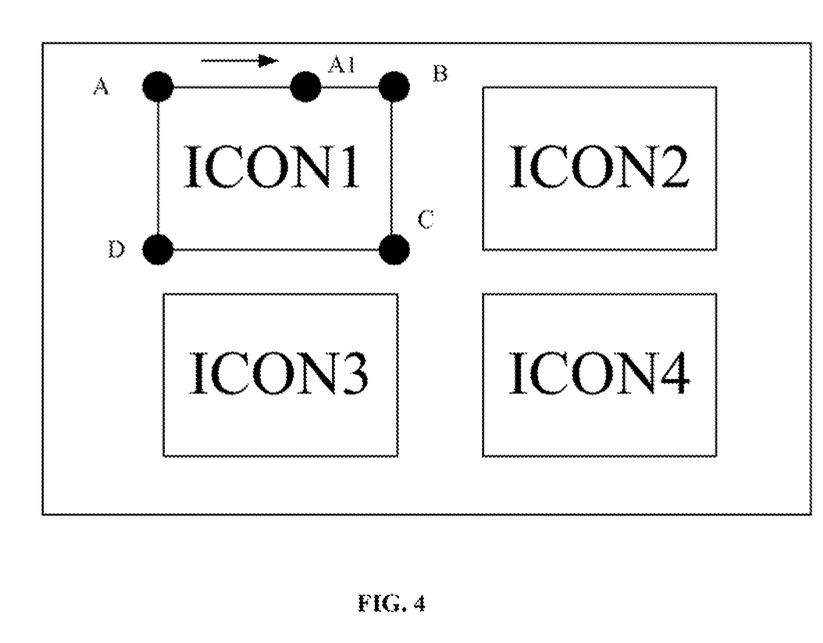
FIG. 4 is a first diagrammatic view of one embodiment of a minimizing process of an icon.
Figure 5:
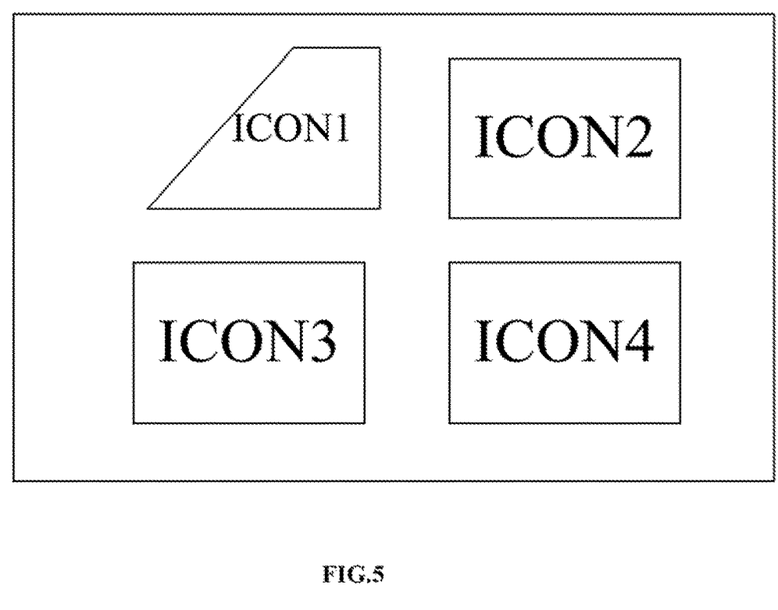
FIG. 5 is a second diagrammatic view of one embodiment of a minimizing process of an icon.

FIGS. 4 and 5 illustrate one embodiment of a minimizing process of an icon. The touch screen 21 displays four icons (icon 1, icon 2, icon 3, and icon 4). A user selects icon 1 for adjustment. The obtaining module 12 obtains four movable points A, B, C, and D of the icon 1 and marks the points with the four black dots shown in FIG. 4. The user can move any of the four movable points to adjust the icon 1. As shown in FIG. 4, the moving module 13 determines that the user applies a move operation to the movable point A towards the inside of the icon 1. The movable point A is moved from an initial position to the destination position point A1. The adjustment module 14 minimizes the icon 1 according to the move operation. In the minimizing process of the icon 1, the adjustment module 14 re-establishes the shape of the icon 1 by a line which connects the vertexes B, D, and point A1 to form minimized icon 1 shown in FIG. 5.

Figure 6:
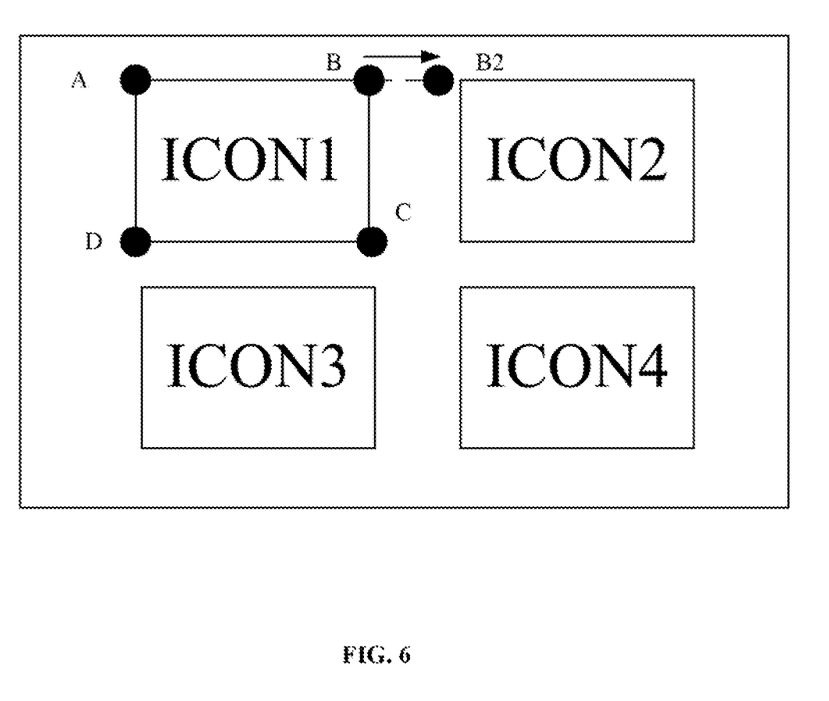
FIG. 6 is a first diagrammatic view of one embodiment of a magnification process of an icon.
Figure 7:
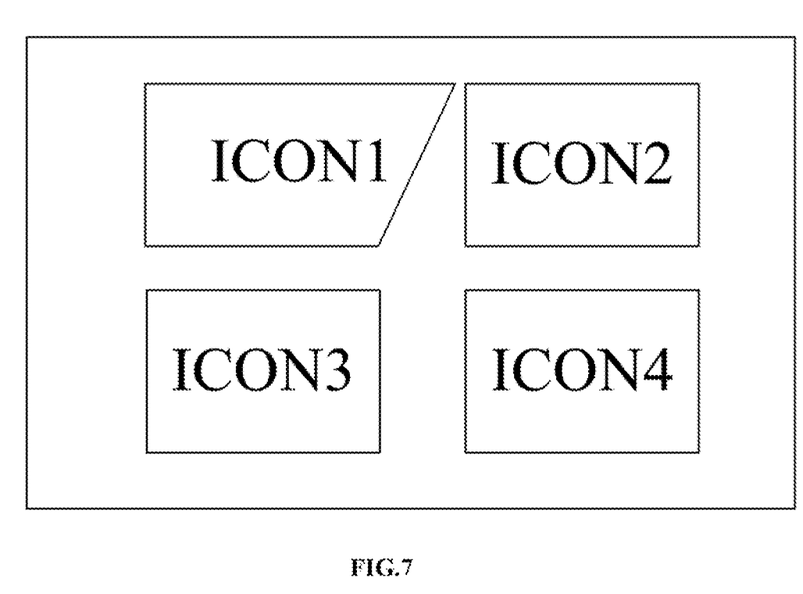
FIG. 7 is a second diagrammatic view of one embodiment of a minimizing process of an icon.

FIGS. 6 and 7 illustrate one embodiment of a magnification process of an icon. In the embodiment, as shown in FIG. 6, a user applies a move operation to the movable point B away from the icon 1. The movable point B is moved from an initial position to the destination position point B2. The adjustment module 14 magnifies the icon 1 according to the move operation. In the magnification process of the icon 1, the adjustment module 14 re-establishes the shape of the icon 1 by a line connecting the vertexes A, C, and point B2 to form magnified icon 1, as shown in FIG. 7.

In one embodiment, the adjustment module 14 further adjusts size of content displayed on the icon in a minimizing or magnification process. The size of the adjusted content is associated with the size of the adjusted icon. The content displayed on the icon can include, but is not limited to, characters, pictures, signs, titles in text, or the like. Referring to FIG. 5, when the icon 1 is minimized, the text "icon 1" displayed in the icon 1 is minimized accordingly. The location of the text "icon 1" displayed in the icon 1 can also be changed, so that the minimized text can be legibly displayed in the minimized icon 1.

In other embodiments, the adjustment module 14 further determines whether a size of the magnified icon is bigger than a predefined size, for example twice the initial size. When the size of the magnified icon is bigger than a predefined size, the adjustment module 14 obtains more information relating to the application program associated with the icon, and the display module 15 can obtain and display further informative content in the magnified icon. In the embodiment, quantity of the information displayed is in a positive correlation with the size of the magnified icon.

For example, if a size of a short message icon has been magnified, the adjustment module 14 determines whether the size of the magnified short message icon is bigger than a predefined size. When the size of the magnified short message icon is bigger than the predefined size, the adjustment module 14 can obtain list of unopened emails, or content of the newest received short message. The display module 15 can obtain and display such further content in the magnified short message icon.

At block 305, the display module displays the adjusted icon and content, or additional content.

The embodiments shown and described above are only examples. Many details are often found in the art and many such details are therefore neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for adjusting icons, the method executable by at least one processor of an electronic device, the method comprising:
   obtaining movable points of an icon and visibly marking the movable points on a display of the electronic device;
   determining a selected movable point and a move operation to be applied on the selected movable point, the move operation comprising a move direction and a move distance;
   adjusting shape and size of the icon according to the determined move direction and the move distance of the move operation, wherein a shape of the adjusted icon is re-establishing by line connecting a moved vertex point and two neighboring vertex points in a minimization or magnification process of the icon when the movable point is a vertex movable point ; and
   displaying the adjusted icon on the display of the electronic device.

2. The method according to claim 1, wherein a request is determined to be made to adjust the icon when a touch location of the input operation is determined to be lied at one of vertexes of the icon.

3. The method according to claim 2, wherein the icon is minimized when the move direction is towards inside of the icon; and the icon is magnified when the move direction is away from the icon.

4. The method according to claim 3, further comprising:
   determining whether a size of the magnified icon is bigger than a predefined size;
   obtaining information relating to the application program associated with the icon when the size of the magnified icon is bigger than the predefined size; and
   displaying the obtained further informative in the magnified icon.

5. The method according to claim 3, further comprising adjusting size of content displayed in the icon in a minimization or magnification process.

6. The method according to claim 3, wherein the icon is minimized by folding the icon or compressing the icon.

7. The method according to claim 3, wherein a shape of the adjusted icon is re-established by line connecting between the moved side point and two vertex points of the side which includes the side movable point in a minimization or magnification process of the icon when the movable point is a side movable point.

8. An electronic device, comprising:
   a touch screen for displaying a plurality of icons of application programs;
   a processor; and
   a storage device that stores one or more programs which, when executed by the at least one processor, cause the at least one processor to:
   obtain movable points of an icon and visibly marking the movable points on the touch screen;
   determine a selected movable point and a move operation to be applied on the selected movable point, the move operation comprising a move direction and a move distance;
   adjust shape and size of the icon according to the determined move direction and the determined move distance of the move operation, wherein a shape of the adjusted icon is re-establishing by line connecting a moved vertex point and two neighboring vertex points in a minimization or magnification process of the icon when the movable point is a vertex movable point; and
   display the adjusted icon on the touch screen.

9. The electronic device according to claim 8, wherein the processor is caused to: minimize the icon when the move direction is towards inside of the icon, and magnify the icon when the move direction is away from the icon.

10. The electronic device according to claim 9, wherein the processor is further caused to:
    determine whether a size of the magnified icon is bigger than a predefined size;
    obtain information relating to the application program associated with the icon when the size of the magnified icon is bigger than the predefined size; and
    display the obtained further informative in the magnified icon.

11. The electronic device according to claim 9, wherein the processor is further caused to: adjust size of content displayed in the icon in a minimization or magnification process.

12. The electronic device according to claim 9, wherein the processor is further caused to: re-establish a shape of the adjusted icon by line connecting between the moveable point and two vertex points of the side which includes the side moved point in a minimization or magnification process of the icon when the movable point is a side movable point.

13. A non-transitory storage medium having stored thereon instructions that, when executed by a processor of an electronic device, causes the processor to perform a method for adjusting icons, wherein the method comprises:
    obtaining movable points of an icon and visibly marking the movable points on a touch screen of the electronic device;
    determining a selected movable point and a move operation to be applied on the selected movable point, the move operation comprising a move direction and a move distance;
    adjusting shape and size of the icon according to the determined move direction and the move distance of the move operation, wherein a shape of the adjusted icon is re-establishing by line connecting a moved vertex point and two neighboring vertex points in a minimization or magnification process of the icon when the movable point is a vertex movable point; and
    displaying the adjusted icon on the touch screen of the electronic device.

14. The non-transitory storage medium according to claim 13, further comprising:
    minimizing the icon when the move direction is towards inside of the icon, and magnifying the icon when the move direction is away from the icon.

15. The non-transitory storage medium according to claim 14, further comprising: adjusting size of content displayed in the icon in a minimization or magnification process of the icon.

16. The non-transitory storage medium according to claim 14, further comprising: re-establishing a shape of the adjusted icon by line connecting between the moved side point and two vertex points of the side which includes the moved side point in a minimization or magnification process of the icon when the movable point is a side movable point.

17. The non-transitory storage medium according to claim 13, further comprising: determining a request is made to adjust the icon when a touch location of the input operation is determined to be lied at one of vertexes of the icon.

* * * * *